Patented July 9, 1929.

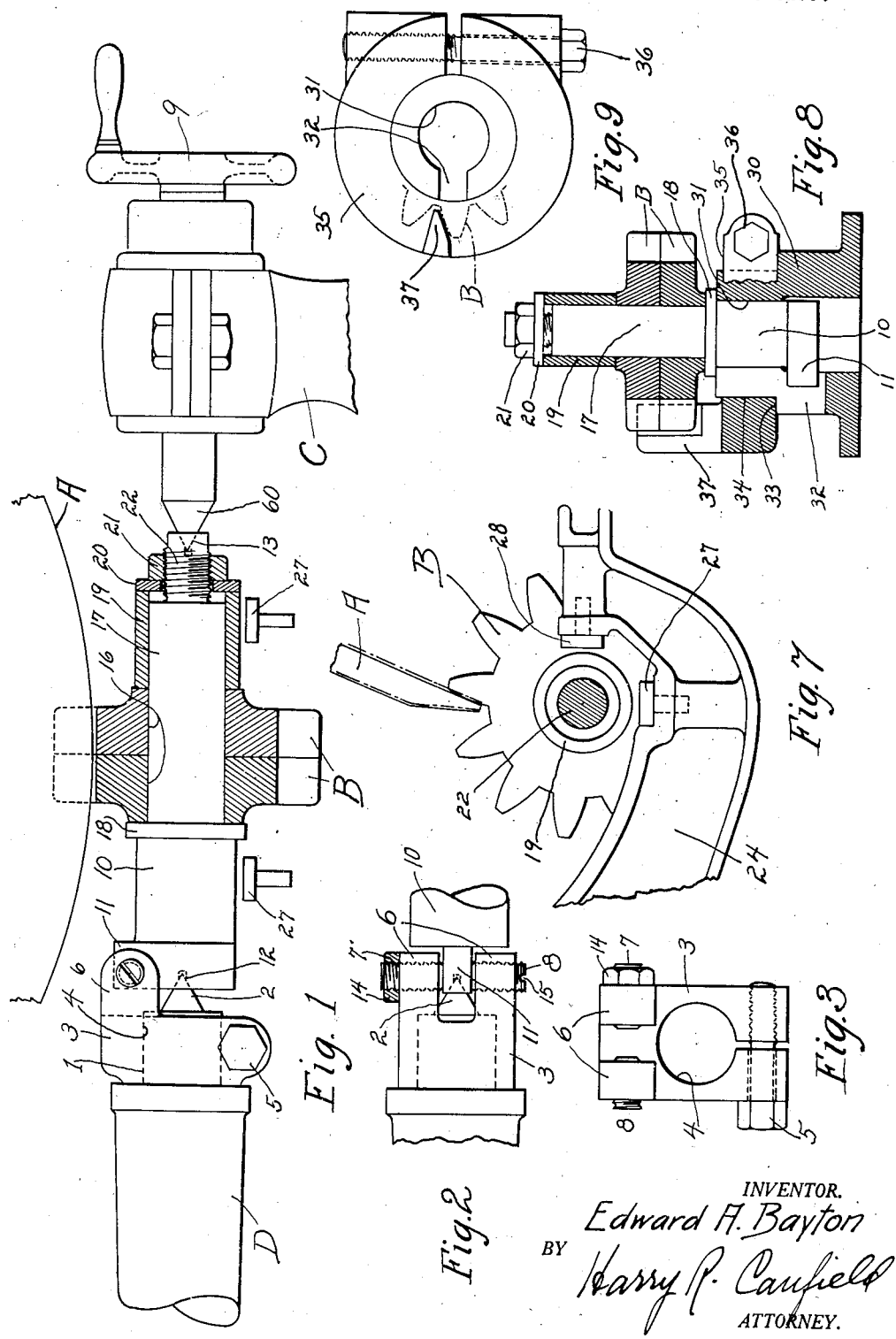

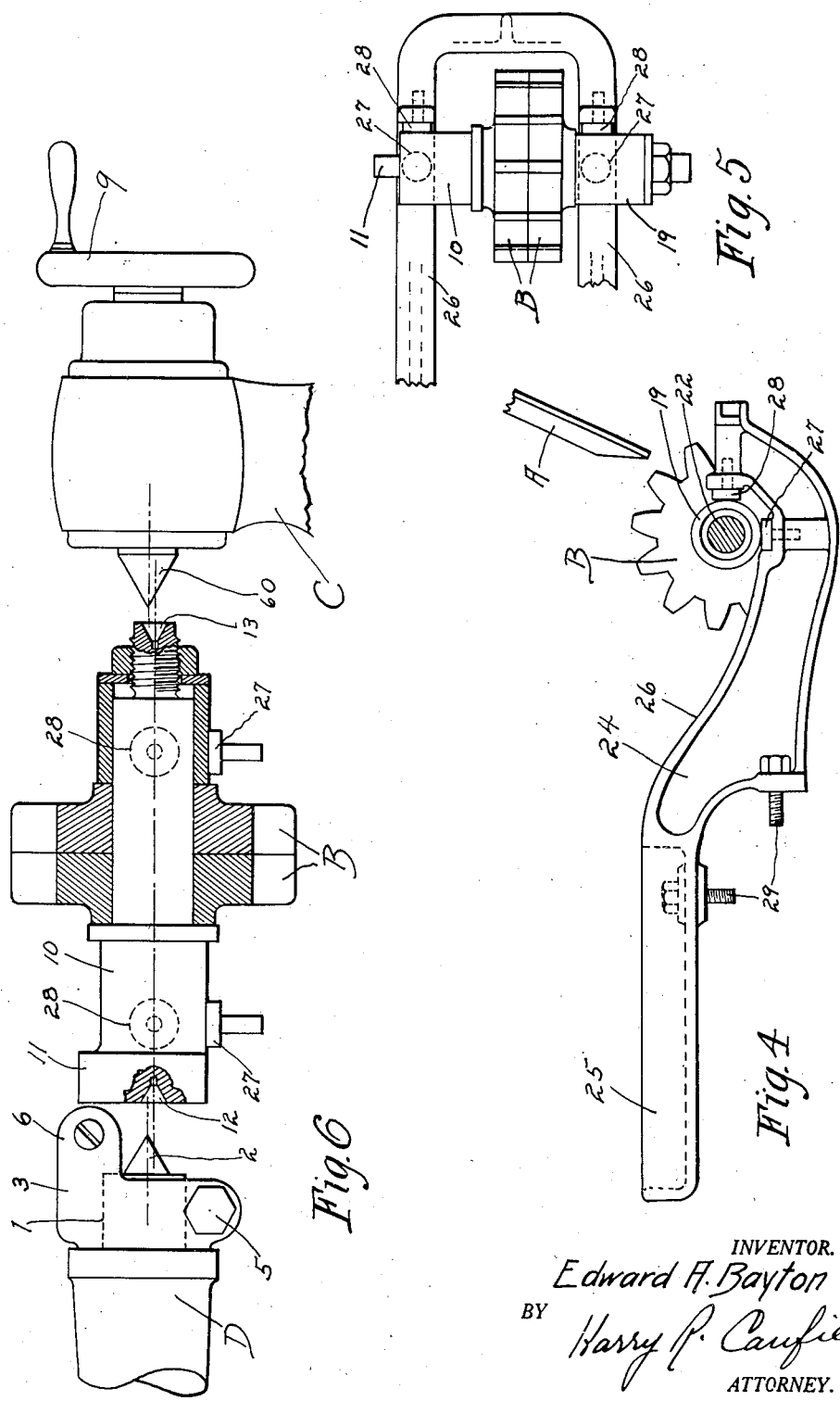

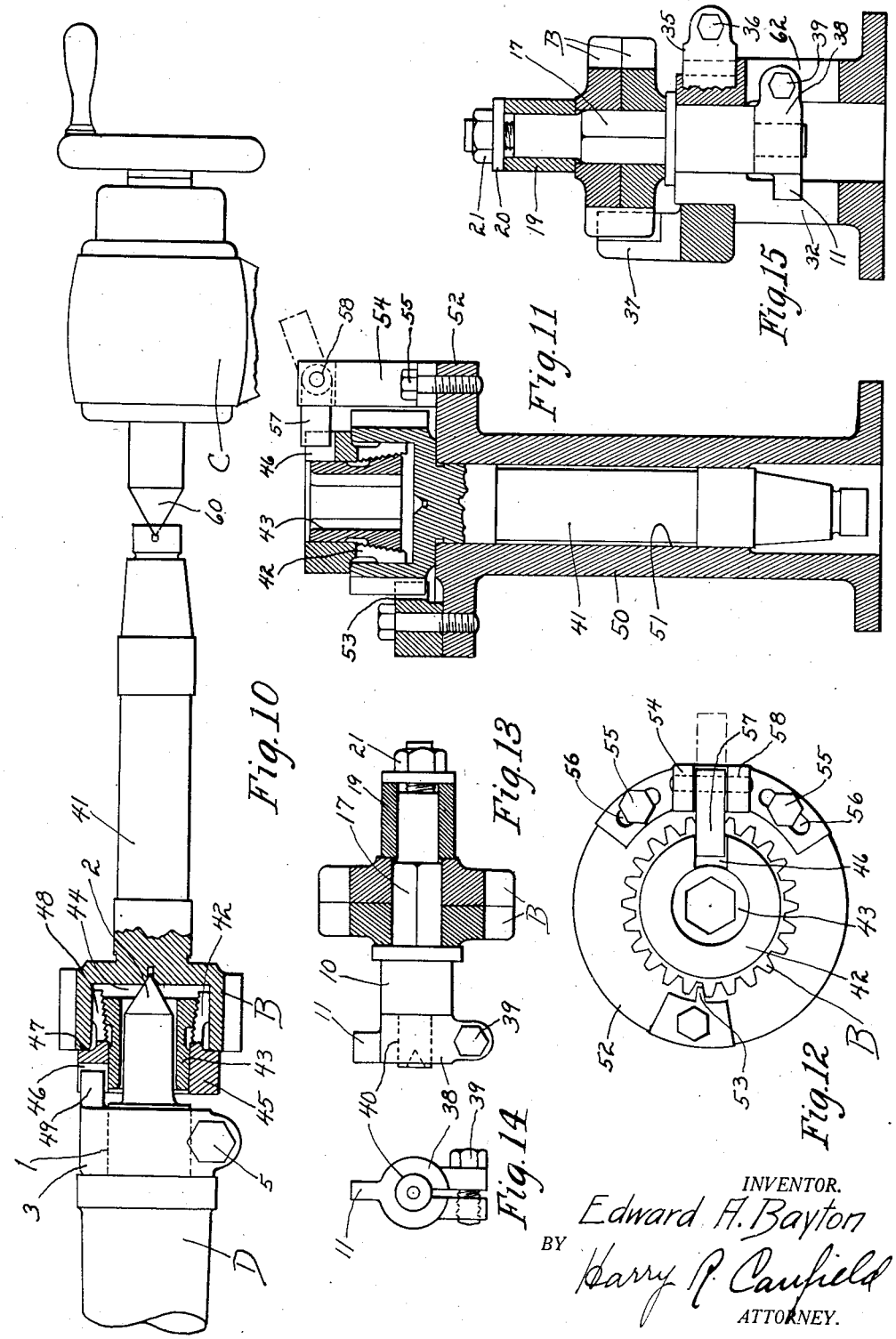

1,720,620

UNITED STATES PATENT OFFICE.

EDWARD A. BAYTON, OF DETROIT, MICHIGAN, ASSIGNOR TO THE LEES-BRADNER COMPANY, OF CLEVELAND, OHIO.

LOADING DEVICE FOR GRINDING MACHINES.

Application filed February 25, 1926. Serial No. 90,468.

This invention relates to machine tools and particularly to the means by which work pieces to be operated upon are positioned in the machine for rapid production purposes.

The invention is illustrated and described as applied to a gear grinding machine in which gear teeth, already rough formed, are ground to size and surfaced. The invention is applicable, however, to machine tools of other types performing operations other than grinding and upon kinds of work pieces other than gears.

In certain classes of production work such, for example, as the grinding of gear teeth, when the gear is placed in the machine tool it must be so positioned in the machine that the teeth of the gear will take up accurately a predetermined position relative to the grinding wheel.

In some cases the grinding operation removes only a few thousandths of an inch of metal and the gear must be located in the machine relatively to the grinding wheel to a very high degree of accuracy. Heretofore, in obtaining this degree of accuracy considerable production time has been lost on each gear in positioning it in the machine.

The main object of this invention therefore, is to provide means by which gears or other work pieces may be placed in a machine tool and very quickly located relatively to the grinding wheel or other work tool to a high degree of accuracy.

Another object is to provide such means in a machine tool which can be quickly adapted or set up to accommodate the particular size or kind of work piece to be worked upon, as when changing from a lot of one size or kind to another.

Other objects will be apparent.

In the accompanying drawings Fig. 1 is a side view, partly in section, of one form of my invention as applied to a gear grinding machine.

Fig. 2 is a top view of some of the parts of Fig. 1.

Fig. 3 is an end view of a clutch member shown in Figs. 1 and 2.

Fig. 4 is a side view of a bracket forming part of a grinding machine and employed in the application of my invention.

Fig. 5 is a partial top view of the parts of Fig. 4.

Fig. 6 is a view similar to Fig. 1 showing the parts in different positions.

Fig. 7 is a partial view similar to Fig. 4 drawn to a larger scale and with the parts in different positions.

Figs. 8 and 9 are respectively a side sectional view and a top view of a positioning device used in connection with my invention.

Fig. 10 is a view similar to Fig. 1 but showing my invention in another form.

Figs. 11 and 12 are respectively a side sectional view and a top view of the positioning device when used with the form of my invention shown in Fig. 10.

Fig. 13 illustrates another form of my invention with the parts of the grinding machine omitted.

Fig. 14 is an end view of some of the parts of Fig. 13.

Fig. 15 is a side sectional view of a positioning device as adapted to the form of my invention in Fig. 13.

In describing my invention as applied to a gear grinding machine it is deemed necessary to refer only to those parts of the machine which are directly associated with my invention. To this end I have shown at A the grinding or abrading wheel; B, the gear to be ground; C, the tailstock; and D, the work carrying spindle. The spindle D may be rotated, oscillated and indexed in any suitable manner to transmit to the gear B the motion required in grinding it. For a more complete description of a gear tooth grinding machine reference may be had to the U. S. Patent No. 1,390,145, E. J. Lees, September 6, 1921.

The end of the spindle D is terminated in a portion of reduced section 1 having on its extreme end a center 2. On the reduced portion 1 is mounted an adjustable clutch 3, having a bore 4 which fits thereon. By means of the clamp screw 5 the clutch can be released and turned around on the reduced portion 1 into any angular position relative to the axis of the spindle and then clamped in such position. On one side of the spindle axis, the clutch carries two clutch jaws 6 provided with adjusting screws 7 and 8. The inner ends of these screws are faced off square with their axes for a purpose to be described.

The tailstock C may be of any suitable form but preferably I employ one having a handwheel 9 which when turned causes the center 60 to be moved inwardly or outwardly along its axis in a well known manner.

I show two similar gears B—B to be ground; (it being more economical to grind two at a time when this can be done). The gears B—B are mounted on a gear or work piece holder 10 the left end (in Fig. 1) of which terminates in a clutch dog 11 formed by shaping the body of the holder 10, (see also Fig. 2). In the two extreme ends of the holder 10 are center holes 12 and 13. When the holder 10 is mounted on the centers 2 and 60 by engagement of these centers with the center holes 12 and 13, in the usual manner, the dog 11 is inserted between the inner ends of the adjusting screws 7 and 8, (Fig. 2). The screw 7 has a lock nut 14 so that it can be fixed in position, and the screw 8 has a slot 15 by which it can be adjusted. With this arrangement and with the screw ends faced off as above referred to, the dog 11 may be caused to fit in the clutch 3 very accurately.

The gears B—B have cylindrical bores 16—16 therein, in the form of my invention shown in Fig. 1, and they are mounted upon a shank 17 of a reduced section forming part of the holder 10 and abutted against a collar 18 on the holder, being held against the collar and rigidly secured against movement on the holder by means of a cylindrical sleeve 19, washer 20, and clamp nut 21, the sleeve 19 fitting over the shank 17 and the nut 21 having corresponding threads on the reduced end 22 of the holder.

The holder 10, gears B—B, and the associated parts above described for securing the two together may be considered as a gear-holding-unit or work-piece-holding-unit and will be so referred to hereinafter.

To facilitate mounting the gear-holding-unit on the centers 2 and 60, and the engagement of the clutch dog 11 with the clutch jaws 6, I provide an auxiliary support, (Figs. 4 and 5), consisting of a main bracket 24 having a work holding tray 25, sloping guide rails 26, a pair of bottom stops 27, and a pair of back stops 28. I further provide bolts 29 by which the auxiliary support as a whole may be mounted upon and secured to the main frame of the grinding machine in any suitable place such for instance as on the frame S of the grinding machine of the patent above referred to.

In Fig. 1 and Fig. 6, only the stops 27 and 28 of the auxiliary support are shown for the sake of simplicity in the drawing, and in connection with these figures the operation of the auxiliary support will now be described.

The work-piece-holding-unit is placed temporarily in the tray 25 and when the time comes to mount it in the machine it is placed by the operator on the rails 26 and is thereby guided into position on the stops 27 and 28, as shown in Figs. 4, 5 and 6. By referring to Fig. 6 it will be noted that when the unit is resting on the stops 27 and 28 the center line of the centers 2 and 60 is not coincident with the center line of the center holes 12 and 13 of the work-piece-holding-unit but are not so far out of line that the centers will not engage the center holes. The work-piece-holding-unit is now rotated on the stops by hand to bring the clutch dog 11 opposite the two clutch jaws 6. By rotating the handle 9 on the bracket C the center 60 will move outwardly (to the left in Fig. 6) engaging the center hole 13, and bodily moving the unit axially causing the center hole 12 to engage the center 2 and the dog 11 to engage the jaws 6, and as the wheel is turned further the centers will seat in the center holes bodily lifting the unit away from the stops 27 and the parts will assume the positions shown in Fig. 1.

By properly positioning the stops 27 and 28 with respect to the center line of the centers 2 and 60 it will be understood that when the center 60 is advanced the gear-holding-unit will not only be lifted from the stops 27 but also will be moved bodily from the stops 28 and will take up the position shown in Fig. 7 with respect to both pairs of stops thus adapting it to be rotated freely out of contact with the stops.

The sleeve 19 by which one end of the unit is supported on the stops is preferably made of approximately the same diameter as the main body 10 of the work piece holder for reasons which will be apparent in connection with the above description.

As will be understood, spindle D and bracket C carrying the centers 2 and 60, respectively, are, in a grinding machine, moved relatively to the abrading wheel A to move the gear teeth relatively to the wheel for grinding them. It will be apparent therefore that the gear and its teeth must be positioned on the holder 10 relatively to the wheel before the grinding can be properly performed and I provide for this by the following means. With the gear-holding-unit in position on the centers as shown in Fig. 1 and Fig. 7 the wheel A is first moved by well known adjusting means to the solid line position in Fig. 7. The clamp screw 5 on clutch 3 is then released and the gear-holding-unit is rotated on the centers until a tooth of the gear just touches the wheel. In rotating the unit, the clutch 3 rotates with it on the reduced portion 1 of the spindle to a corresponding position. The clutch 3 is then clamped in this position by tightening the screw 5. By operating the grinding machine the gear is next moved away from the wheel and the wheel is then adjusted to the broken line position in Fig. 7, the difference between this position and the solid line position indicating the amount of metal to be removed from the gear. The grinding machine is then started up and the grinding operation proceeds in the usual manner.

Instead of adjusting the position of the clutch 3 to coordinate with the position of the gear B—B, the clutch 3 may first be clamped in any convenient or desirable position and the gears B—B rotated on the shank 17 into the correct position and secured thereby tightening the nut 21. Or both the clutch 3 and nut 21 may be left loose until the parts have been adjusted and then both tightened.

For production purposes, in order to quickly position the gears B—B on the holder 10 relatively to the spindle D so that the gear teeth will take up their correct position in relation to the wheel A, I provide the positioning means shown in Figs. 8 and 9 which will now be described. The main body 30 of the positioning device has a bore 31 of approximately the same size as the main body 10 of the work-piece-holding-unit and on one side has a keyway 32 of approximately the same width as the thickness of clutch dog 11. The upper part of the main body is turned down to provide a shoulder 33 and neck 34 on which is rotatably mounted a clamp ring 35 having a clamp screw 36 and provided with a gauge finger 37 projecting upwardly therefrom.

To adjust the device for use, a work-piece-holding-unit (in which the dog 11 and gears B—B have been coordinated with the clutch 3 to establish the correct relations between the gear and the wheel, as above described) is placed in the device as shown in Fig. 8, with the dog 11 in the keyway 32 and the shoulder 18 on the top of the body 30 of the device. The clamp screw 36 of the device is then released and the clamp ring 35 is rotated until the gauge finger 37 just touches a gear tooth. The clamp screw 36 is then tightened. Thereafter, in production, to assemble other work-piece-holding units with the clutch dog and gear in exactly the correct relation the operator places a work holder in the device as shown in Fig. 8, puts the gears B—B on the shank 17 of the holder, rotates the gears on the shank until a tooth touches the gauge finger and with them in this position puts on the sleeve 19, washer 20, nut 21 and tightens up the nut. The unit is then removed from the device and is ready to be mounted in the machine for grinding.

In Figs. 13 and 14 I show a modification in which the gears B—B have a rectangular or square hole and the holder has a square shank 17. In this form since the gear can not be rotated with respect to the holder, I make the clutch dog 11 rotatable by forming it on a detachable holder-clamp 38 having a clamp screw 39 and mounted on a reduced end 40 of the holder 10. By this construction with the clutch 3 on the spindle already fixed in position, the holder-clamp 38 can be adjusted until its dog 11 and jaws 6 of clutch 3 engage each other, and the gear teeth and the wheel will then be in proper relation as will be understood.

In Fig. 15 is shown the positioning device for use with the form of holder shown in Fig. 13. It is similar to the device in Fig. 8. An opening 62 is made by which access may be had to the clamp screw 39 on the holder clamp 38. This positioning device is adjusted in the same manner as the one in Fig. 8. Thereafter in assembling units, the gears B—B and the other parts including the nut 21 are first assembled together in their final position; this unit is then placed in the device with the clamp screw 39 loose. The unit is then rotated until the gear teeth engage the finger 37, the clamp 38 being held against rotation by the engagement of its dog 11 with the keyway 32. The clamp screw 39 is then tightened and the unit is ready to be placed in the machine.

In the form of my invention shown in Fig. 10 the gear B is of a different type. The gear-holding-unit consists of the gear B to be ground, the stem 41 formed integrally with the gear B, the collet 42 and nut 43. The gear B is recessed as at 44 to receive the collet and nut. The collet comprises an annular body 45 having a clutch jaw 46 (only one side of which is shown), a shoulder 47 engaging the gear B, and collet jaws 48 outwardly engaging the gear B and inwardly threaded to engage the nut 43. The nut 43 is generally cylindrical and has a hollow, hexagonal bore for a wrench; its outer surface is on one end threaded to engage the threads on the collet and on the other end is turned to fit the inside surface of the annular body 45 of the collet. By means of these parts, the gear can be rotated on its axis relatively to the clutch jaw 46 and fixed in any such position by tightening the nut 43 as will be understood. Corresponding to these parts the spindle D is provided with a longer center 2 to enter the recess of the gear and the clutch 3 on the reduced portion 1 of the spindle is provided with a clutch dog 49 coordinating with the clutch jaw 46. In this form of my invention, the gear-holder, as in the other forms, consists of the parts of the gear-holding-unit exclusive of the gear proper, namely the stem 41, nut 43 and collet 42.

To adjust the gear to the spindle and abrading wheel, the clutch 3 may be loosened, by loosening the clamp screw 5, and with the clutch jaw 46 and dog 49 in engagement, the gear may be turned into its proper position with respect to the wheel turning the clutch with it; and the clutch 3 may then be tightened to maintain the adjustment.

The positioning device, Figs. 11 and 12, used with the form of unit shown in Fig. 10 consists of a main body 50 having a bore 51 of approximately the diameter of the stem 41 of the gear, and a flange 52 on its upper end. The flange is preferably circular and on one side is provided with a gauge finger 53 bolted thereon and on the other side has a standard 54 which is circumferentially adjustable on the flange by means of bolts 55 and circular slots 56. The standard projects upwardly and at its upper end carries a clutch finger 57 pivoted thereto by a pin 58 and adapted to be rotated from the solid line to the dotted line positions and vice versa.

To adjust the device for use, the clutch finger 57 is first rotated out of the way into the dotted position. A work-piece-holding-unit (in which the clutch jaw 46 and gear B have been coordinated with the clutch 3 to establish the correct relations between the gear and the wheel as above described) is placed in the device as shown in Fig. 11 with one of the gear teeth touching the gauge finger 53. The bolts 55 are then loosened and the standard 54 is revolved around the axis of the device until the clutch finger 57 can be rotated into the solid line position in engagement with the clutch jaw 46. The bolts are then tightened.

Thereafter, in production, to assemble other work-piece-holding units with the clutch jaws 46 and gear in exactly the correct relation, the operator places a gear in the positioning device as shown in Fig. 11 with a tooth of the gear in engagement with the gauge finger 53. The nut 43 is then loosened by means of a wrench inserted in the hexagonal bore thereof. This releases the collet 42 and hence the clutch jaws 46 can be revolved around the axis of the gear until they engage the clutch finger 57. The nut is then tightened and after rotating the clutch finger 57 out of the way the unit can be removed from the device.

Any of the several forms of positioning device may be mounted on the grinding machine at any suitable point convenient to the operator. As this is obvious it has not been described or indicated in the drawing.

In the employment of my invention for rapid production purposes, I preferably provide a number of work or gear holders, and by assembling the gears or work pieces on the holders I provide in advance a quantity or supply of work-piece-holding-units or gear-holding-units ready for mounting in the machine.

It will be noted that I have provided means for establishing a predetermined positional relation between the gear and some reference point such as a clutch member on the gear holder; also for establishing a predetermined relation between the gear and grinding wheel; and a predetermined relation between the wheel and the clutch member on the spindle. My invention is not limited to the particular clutch means for driving the gear from the spindle nor to the details of construction by which these predetermined positions are brought about.

I claim:—

1. In apparatus of the class described in which a work holder and a toothed work piece are first assembled and then mounted in a machine tool, means for determining the position of the work piece in the machine, comprising a machine engageable element on the holder, means for positioning the work piece on the holder with a tooth thereof in a predetermined position relative to the machine engageable element comprising structural elements of the holder permitting relative movement between the engageable means and the work piece, means on the holder for fixing the work piece and machine engageable element in said relative position, and an auxiliary assembling device for locating the work piece and machine engageable element in said relative position.

2. In a machine tool, a work piece holder provided with machine engaging means and being adapted to support a toothed work piece and having structural elements permitting relative movement between the engaging means and the work piece, whereby the engaging means and a tooth of the work piece may occupy predetermined positions relative to each other, means for fixing the work piece and said engaging means in said positional relation, the machine including a work tool and a work holder engaging means, the latter means being so positioned on the machine relative to the tool as to cause a tooth of the work piece automatically to take up a predetermined position relative to the work tool when the holder is mounted in the machine with the two engaging means engaged.

3. In a machine tool, a work piece holder provided with machine engaging means and being adapted to support a toothed work piece and having structural elements permitting relative movement between the engaging means and the work piece whereby the engaging means and a tooth of the work piece may occupy predetermined positions relative to each other, auxiliary means for establishing said positional relation, means for fixing the work piece and said engaging means in said positional relation, the machine including a work tool and a work holder engaging means, the latter means being so positioned on the machine relative to the tool as to cause a tooth of the work piece automatically to take up a predetermined position relative to the work tool when the holder is mounted in the machine with the two engaging means engaged.

4. In a machine tool, a work piece holder provided with machine engaging means and being adapted to support a toothed work piece in a fixed position on the holder in which a tooth thereof bears a predetermined positional relation to the machine engaging means, the machine including a work tool and a work holder engaging means, the latter means being movable on the machine into such a position relative to the tool as to cause a tooth of the work piece automatically to take up a predetermined position relative to the tool when the holder is mounted in the machine with the two engaging means engaged.

5. In a machine tool, a work piece holder provided with machine engaging means and being adapted to support a toothed work piece in a fixed position on the holder in which a tooth thereof bears a predetermined positional relation to the machine engaging means, auxiliary means for establishing said positional relation, the machine including a work tool and a work holder engaging means, the latter means being movable on the machine into such a position relative to the tool as to cause a tooth of the work piece automatically to take up a predetermined position relative to the tool when the holder is mounted in the machine with the two engaging means engaged.

6. In combination, a machine and a work piece holding unit; the unit including a work piece holder, means thereon engageable by the machine, and a work piece secured on the holder in a predetermined position, the machine including a work tool, unit positioning means and an auxiliary support for the unit, the unit positioning means being adapted to move to engage the unit and move it bodily from the auxiliary support into a working position on the machine in which the work piece occupies a predetermined position relative to the work tool.

7. In combination, a machine and a work piece holding unit; the unit including a work piece holder, provided with centerable means for centering it on the machine, and a work piece secured on the holder in a predetermined position, the machine including a work tool, an auxiliary support for the unit, unit engaging means and unit centering means, the unit centering means being adapted to move to engage the centerable means of the unit and move the unit bodily from the auxiliary support into a working position on the machine, and the unit engaging means being adapted to determine a predetermined working position for the work piece relative to the work tool.

8. In combination, in a machine of the class described, a work tool. a pair of relatively movable centers, an auxiliary support, a work piece unit including a work piece holder having center holes and supporting a work piece, the unit being adapted to be positioned in the machine with the supported work piece in a predetermined working position relative to the work tool, and means for positioning the unit on the support in such position relative to the machine that when the centers are moved they engage the center holes and move the work piece unit bodily from the support into said working position.

9. In combination, in a machine of the class described, an auxiliary support for supporting a work piece in a predetermined position on the machine, movable work piece engaging members on the machine, engageable means associated with a work piece on the auxiliary support, the engaging members being adapted to move to engage the engageable means to move the work piece from said predetermined position on the support and move it to and support it in a working position on the machine.

10. In apparatus of the class described, a machine, a work tool on the machine, means for positioning a work piece on the machine in a predetermined position relative to the work tool, said means including a work piece holder, a machine engaging means thereon, a holder engaging means on the machine occupying a predetermined position relative to the work tool, and auxiliary means for positioning the work piece on the holder in a predetermined position relative to the machine engaging means.

11. In apparatus of the class described, a machine, a work tool on the machine, means for positioning a work piece in the machine in a predetermined position relative to the work tool, said means including a holder for the work piece, a machine engaging means on the holder, a holder engaging means on the machine, auxiliary means for positioning the work piece on the holder in a predetermined position relative to the machine engaging means, and means for positioning the holder engaging means on the machine relatively to the work tool coordinately with the said predetermined position of the work piece on the holder.

12. In apparatus of the class described, a machine, a work tool on the machine, means for successively positioning work pieces in the machine each in a predetermined position relative to the work tool, said means including a holder for the work piece, a machine engaging means on the holder, a holder engaging means on the machine engageable with the machine engaging means, means for positioning the initial work piece on its holder relatively to the work tool and auxiliary positioning means for similarly positioning succeeding work pieces and their holders relative to each other.

13. A gear grinding apparatus including a gear grinding machine, a work gear holding unit for production purposes and an auxiliary device; the unit comprising a gear holder and a work gear adapted, when assembled, to be mounted in the gear grinding machine and adapted to present a tooth of the gear to the grinding wheel in a predetermined positional relation thereto, the holder being provided with means for supporting the gear thereon and provided with means whereby it may be rotatably supported in the machine and provided with an engageable element engageable by a corresponding engaging element on the machine whereby the holder may be operatively rotated on an axis of rotation when in the machine, the gear and said engageable means being relatively rotatable about said holder axis during assembly whereby to bring a tooth of the gear and said engageable element into predetermined rotational positions relative to each other; means on the holder for securing the gear and engageable element in said predetermined relative positions; and the auxiliary device being adapted to receive the assembled gear and holder and being provided with a stop for predetermining the said relative rotational positions of the gear and engageable means on the holder.

In testimony whereof, I have hereunto signed my name.

EDWARD A. BAYTON.